United States Patent
Krause

Patent Number: 6,160,554
Date of Patent: *Dec. 12, 2000

[54] COMPUTER FILE CONTENT PREVIEW WINDOW

[75] Inventor: Michael D Krause, Loveland, Colo.

[73] Assignee: Hewlett Packard Company, Palo Alto, Calif.

[*] Notice: This patent issued on a continued prosecution application filed under 37 CFR 1.53(d), and is subject to the twenty year patent term provisions of 35 U.S.C. 154(a)(2).

[21] Appl. No.: 09/044,655

[22] Filed: Mar. 19, 1998

[51] Int. Cl.$^7$ .................................................. G06F 3/00
[52] U.S. Cl. .................. 345/348; 345/346; 345/349; 345/352
[58] Field of Search ................................. 345/348, 349, 345/356, 346, 350, 351, 354; 707/104

[56] References Cited

U.S. PATENT DOCUMENTS

| | | | |
|---|---|---|---|
| 4,899,276 | 2/1990 | Stadler | 364/300 |
| 5,060,135 | 10/1991 | Levine et al. | 345/351 |
| 5,349,658 | 9/1994 | O'Rourke et al. | 345/349 |
| 5,556,282 | 9/1996 | Middlebrook | 434/178 |
| 5,706,457 | 1/1998 | Dwyer et al. | 395/349 |
| 5,713,740 | 2/1998 | Middlebrook | 434/178 |
| 5,835,094 | 11/1998 | Ermel et al. | 345/355 |
| 5,930,809 | 7/1999 | Middlebrook | 707/501 |

FOREIGN PATENT DOCUMENTS

| | | | |
|---|---|---|---|
| 0415529A2 | 3/1991 | European Pat. Off. | G06F 15/62 |
| 0537100A2 | 4/1993 | European Pat. Off. | G06F 3/033 |
| 0622725A1 | 11/1994 | European Pat. Off. | G06F 3/033 |

OTHER PUBLICATIONS

System 7–Machintosh Reference Guide Apple Computer, Cupertino, CA, US XP002107789 pp. 183–185.
System 7–Macintosh Reference Guide, Passage Tappi Journal, pp. 30, 31, 72, 282 XP002059588.

*Primary Examiner*—Raymond J. Bayerl
*Assistant Examiner*—Cuong T. Thai
*Attorney, Agent, or Firm*—Morley C. Tobey, Jr.

[57] ABSTRACT

A method and apparatus for displaying information descriptive of the contents or intended use of a file. For Graphical User Interfaces on a computer monitor, abbreviated data for the file is displayed in a window opened adjacent to the file icon. The abbreviated data in this window describes the contents of the file. The display window containing the abbreviated data is placed so as to indicate the file to which it is attached and that it describes. Text, graphical, and other types of data can be displayed.

21 Claims, 1 Drawing Sheet

COMPUTER FILE CONTENT PREVIEW WINDOW

FIELD OF THE INVENTION

The present invention relates generally to computers, and more particularly to the display of information from files stored on computer systems.

BACKGROUND OF THE INVENTION

Ascertaining the intended use or contents of a file has been a difficult problem for the computer operator to solve. Previously the operator has had only two ways in which to make this determination. The easiest and fastest means available has been to assign a descriptive name to the file. This technique has presented the operator with several difficulties. Among these difficulties is the fact that on some systems file names may be limited to only 8 characters with a three character extension. Other, more flexible systems now permit up to 255 characters. If an operator does not use a file often, it is easy to forget the connection between the file's name and the file's content or intended use, especially in systems having the lessor number of characters available for naming a file. However, even with 255 characters available, relying on the name of a file as the only means by which one can determine content is dependent upon how well the file was named in the first place. If the naming was done poorly or if the content of the file changes, the only recourse which the operator has is to rename the file. Other drawbacks to using a long file name as a memory aid include the effort required and the lack of reliably encountered when entering the file's name.

Another option available to the computer operator is to launch an application capable of interpreting the format of the file he wishes to use or view. This solution consumes both time and resources. The operator has to wait for the application to load and run before he can view the file. It is also possible for the operator to launch the wrong application. And thus, he may have to close that application and launch another, before he is able to determine the contents of that particular file. Of course, if the file itself is executable, it could be executed in an effort to determine what it contains.

Thus, there is a great need for a fast, convenient, and reliable technique for determining the contents or intended use of a file without depending upon the name of the file and without depending upon launching an application capable of reading the file.

SUMMARY OF THE INVENTION

In a preferred embodiment, the invention provides the ability to view an abbreviated description of a file's content or intended use without the operator having to explicitly open it using an application designed to interpret the file's contents or to execute it. As an example, for systems employing a Graphical User Interface (GUI) a preview window could be invoked by various means, such as by placing a mouse cursor over the file name or icon, by performing a particular mouse click or series of mouse clicks, by selecting a context menu, or by some other means. Representative embodiments described in the present patent document provided for a faster, more convenient, and more reliable technique for determining the contents or intended use of a file than has been previously available.

Using the teachings of the present patent document, the operator does not have to remember interpretations associated with cryptic file names or to use long, unwieldy file names. Also, he does not have to read the contents of the file by launching an application program for that purpose or, if the file is executable, to actually launch the file itself.

A software program constructed in conformance to a preferred embodiment of the invention includes the ability to obtain meta-data which describes a file's content or use, to display that information on a computer monitor, and to remove that data when appropriate.

The operator of a GUI such as Microsoft Windows, Macintosh OS, or X-Windows can choose to generate the file content preview window as stated above by placing the mouse cursor over the file icon, by performing a particular mouse click or series of mouse clicks, by selecting a context menu, or by some other means. The file content preview window may be customized to the type of file being previewed and the type of meta-data information available for the file. The file content preview window may be an add-on piece of functionality for any system in which files are presented to the operator in a graphical form such as in many graphical operating systems that display icons with file names.

When the file content preview window is invoked, it may appear close to and/or connected to the object to which it refers and may overlay the object. The meta data may be textual or graphical. If the operator chooses to preview a graphical file, such as a jpg formatted file, the content preview window could display a thumbnail of the image and other meta-data associated with the file.

In a preferred embodiment described herein, the file content preview window offers an automatic and almost instantaneous method for previewing the contents of a file without having to launch an application. Other aspects and advantages of the present invention will become apparent from the following detailed description, taken in conjunction with the accompanying drawings, illustrating by way of example the principles of the invention.

BRIEF DESCRIPTION OF THE DRAWINGS

The accompanying drawings provide visual representations which will be used to more fully describe the invention and can be used by those skilled in the art to better understand it and its inherent advantages. In these drawings, like reference numerals identify corresponding elements and.

DESCRIPTION OF THE PREFERRED EMBODIMENT

Figure 1:
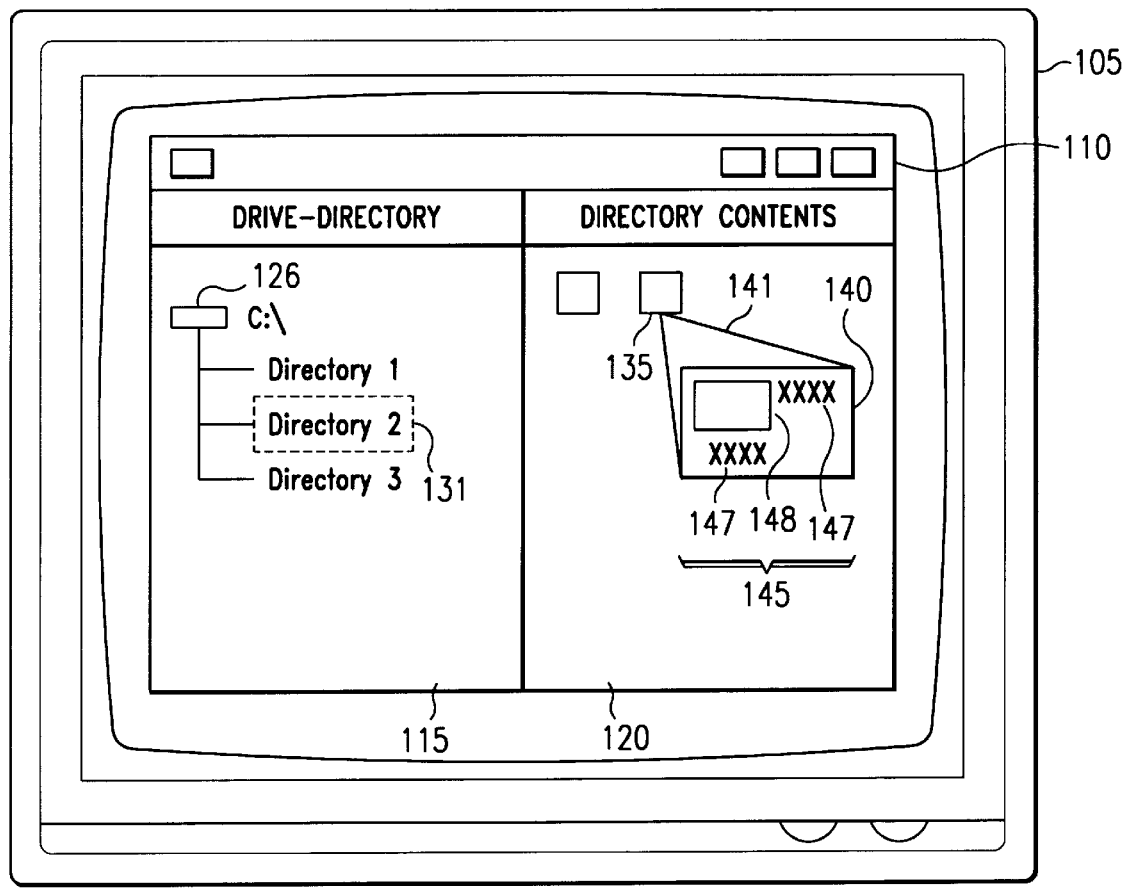
FIG. 1 is a sketch of a content preview window displayed on the screen of a computer monitor as described in various representative embodiments of the present patent document.

As shown in the drawings for purposes of illustration, the present invention relates to a method for quickly and easily displaying information regarding the contents or intended use of a file. In the following detailed description and in the several figures of the drawings, like elements are identified with like reference numerals.

FIG. 1 is a sketch of a monitor window 110, also referred to herein as a Graphical User Interface 110, on a computer monitor 105. As an example, for illustrative purposes, the monitor window 110 contains a drive-directory window 115 and a directory content window 120. In a typical application, a drive 125, not shown but represented by a drive indicator 126, or a directory 130, also not shown but represented by a directory indicator 131, on the drive 125 is selected in the drive-directory window 115 by using the mouse or arrow keys. The contents of that directory 130 are then displayed in the directory content window 120.

Shown on the monitor window 110 is a file content preview window 140, also referred to herein as a display window 140, which provides the ability to view an abbreviation of the contents of a file 134, not shown and also referred to herein as a first file 134 but represented by a file icon 135, also referred to herein as an icon 135, without the operator having to explicitly open it. This is accomplished by accessing meta-data 145 associated with the file 134 or generating meta-data 145 for the file 134 on the fly when the operator wants to preview content or intended use. Meta-data 145 is information which describes other information, and in a preferred embodiment it is information which describes the file 134. It can either be automatically extracted from the file 134 or manually entered. If automatically extracted and the file 134 is textual, the file 134 may be scanned to determine if it contains certain preselected words, phrases or constructs. On the other hand if the file 134 is a graphical one, other types of metadata 145, such as thumbnail sketches, faces, color compositions, frames from a video file, etc. may be extracted. If manually entered, a second file 136, also not shown but manually created and associated with the first file 134, is read in order to extract the meta-data 145.

The operator of a Graphical User Interface 110 such as Microsoft Windows, Macintosh OS, or X-Windows can choose to generate the file content preview window 140 by placing the mouse cursor over the file icon 135, by performing a particular mouse click or series of mouse clicks, by selecting a context menu, or by some other means. The action invoking the file contact preview window 140 may vary from operating system to operating system. The file content preview window 140 provides an overview of the file's contents which may be customized to the type of file 134 being previewed and the type of information available as meta-data 145 for the file 134. The file content preview window 140 may be an add-on piece of functionality for the computer system.

When the file content preview window 140 is invoked, it may appear close to and/or connected to the object to which it refers and may overlay that object. In a preferred embodiment, an indicating geometry 141 is created on the computer monitor 105 between the file content preview window 140 and the file icon 135 in order to draw attention to their relationship to each other. In FIG. 1, the indicating geometry 141 is shown touching both the file content preview window 140 and the file icon 135. However, in other embodiments the indicating geometry 141 may not touch either the file content preview window 140 or the file icon 135 and may or may not be an integral part of the file content preview window 140. In other embodiments, the indicating geometry 141 may be a line or any character or characters created on the computer monitor 105. In yet another embodiment the indicating geometry 141 may be omitted.

The format of the file content preview window 140 varies depending upon the type of file 134 being previewed. The meta-data 145 may contain text meta-data 147, graphical meta-data 148, and/or other types of meta-data 145, as for example color compositions. If the operator chooses to preview a jpg file, i.e., graphical meta-data 148, the file content preview window 140 can display a thumbnail of the image and other abbreviated meta-data 145 associated with the file 134.

Figure 2:
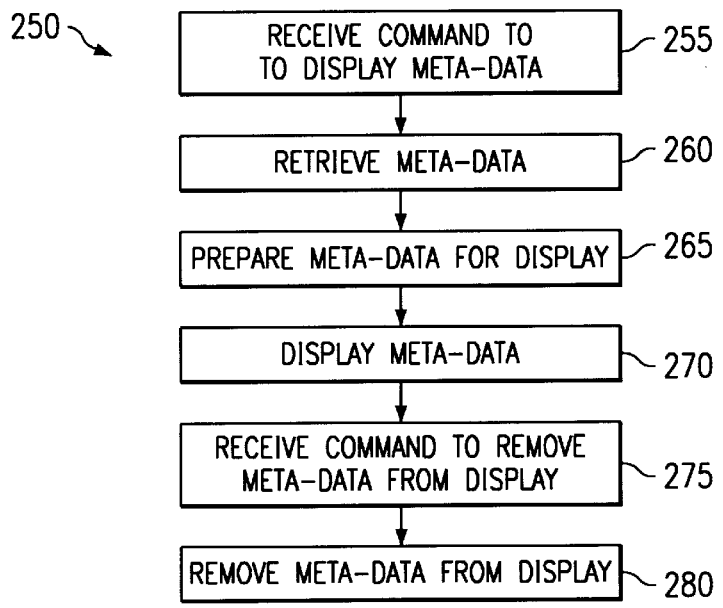
FIG. 2 is a block diagram of a computer software program for retrieving, displaying, and removing meta-data from the display of a computer monitor.

FIG. 2 is a flowchart of a representative embodiment of a software computer program 250 that creates and displays the file content preview window 140 on the computer monitor 105 as shown in FIG. 1. The software computer program 250 retrieves meta-data 145 associated with the file 134, displays that meta-data 145 on the monitor window 110, and removes the meta-data 145 from the monitor window 110. Block 255 is the entry block to the software computer program 250 and receives the command to display the meta-data 145. Block 255 transfers control to block 260.

Block 260 retrieves the meta-data 145 from either the file 134 itself or the associated file, the second file 136. Block 260 then transfers control to block 265.

Block 265 prepares for display the meta-data 145 which could consist of text meta-data 147, graphical meta-data 148, and/or other types of meta-data 145. Block 265 then transfers control to block 270.

Block 270 displays the meta-data 145 on the monitor window 110. Block 270 then transfers control to block 275.

Block 275 receives the command to remove meta-data from the monitor window 110. Block 275 then transfers control to block 280.

Block 280 removes the meta-data 145 from the monitor window 110.

In the preferred embodiments described herein, the file content preview window 140 offers an automatic and almost instantaneous method for previewing the contents of a file without having to launch an application. Although specific embodiments of the invention have been described and illustrated, the invention is not to be limited to the specific forms or arrangements of parts so described and illustrated. The invention is limited only by the claims.

What is claimed is:

1. A display window on a computer monitor, comprising:
 meta-data displayed in the display window, wherein the meta-data comprises a brief description of a first file, wherein the display window is placed in proximity of the first file indicator, wherein the display window appears when the cursor of the computer monitor is placed in the proximity of the icon representing the first file, and wherein the display window disappears when the cursor is removed from the proximity of the icon representing the first file.

2. The display window as in claim 1, wherein the meta-data is obtained from the first file.

3. The display window as in claim 1, wherein the meta-data is data selected from the group consisting of text meta-data and graphical meta-data.

4. The display window as in claim 1, wherein the meta-data is generated from the first file.

5. The display window as in claim 1, wherein the meta-data is obtained from a second file.

6. The display window as in claim 1, wherein the meta-data is generated from a second file.

7. The display window as in claim 1, further comprising:
 an indicating geometry, wherein the indicating geometry is a feature on the computer monitor connecting the display window to the proximity of the icon representing the first file.

8. A method for displaying a display window on a computer monitor, comprising the steps of:
 receiving instruction to display meta-data, wherein the meta-data comprises a brief description of a first file;
 retrieving the meta-data;
 displaying the meta-data on the computer monitor, wherein the display window is placed in proximity of the first file indicator;

when the cursor of the computer monitor is placed in the proximity of the icon representing the first file, displaying the display window on the computer monitor; and when the cursor of the computer monitor is removed from the proximity of the icon representing the first file, removing the display of the display window from the computer monitor.

9. The method as in claim 8, wherein the meta-data is obtained from the first file.

10. The method as in claim 8, wherein the meta-data is data detected from the group consisting of text meta-data and graphical meta-data.

11. The method as in claim 8, wherein the meta-data is generated from the first file.

12. The method as in claim 8, wherein the meta-data is obtained from a second file.

13. The method as in claim 8, wherein the meta-data is generated from a second file.

14. The method as in claim 8, the method steps further comprising:

displaying an indicating geometry on the computer monitor, providing the indicating geometry is a feature on the computer monitor connecting the display window to the proximity of the icon representing the first file.

15. A program storage medium readable by a computer, tangibly embodying a program of instructions executable by a computer to perform method steps for displaying a display window on a computer monitor, said method steps comprising:

receiving instruction to display meta-data, wherein the meta-data comprises a brief description of a first file;

retrieving the meta-data;

displaying the meta-data on the computer monitor, wherein the display window is placed in proximity of the first file indicator;

when the cursor of the computer monitor is placed in the proximity of the icon representing the first file, displaying the display window on the computer monitor; and when the cursor of the computer monitor is removed from the proximity of the icon representing the first file, removing the display of the display window from the computer monitor.

16. The program storage medium as in claim 15, wherein the meta-data is obtained from the first file.

17. The program storage medium as in claim 15, wherein the meta-data is data selected from the group consisting of text meta-data and graphical meta-data.

18. The program storage medium as in claim 15, wherein the meta-data is generated from the first file.

19. The program storage medium as in claim 15, wherein the meta-data is obtained from a second file.

20. The program storage medium as in claim 15, wherein the meta-data is generated from a second file.

21. The program storage medium as in claim 15, the method steps further comprising:

displaying an indicating geometry on the computer monitor, providing the indicating geometry is a feature on the computer monitor connecting the display window to the proximity of the icon representing the first file.

* * * * *